United States Patent [19]
Wither

[11] Patent Number: 5,783,894
[45] Date of Patent: Jul. 21, 1998

[54] METHOD AND APPARATUS FOR GENERATING ELECTRICAL ENERGY

[76] Inventor: Thomas A. Wither, 1204 Grove Ave., Royal Oak, Mich. 48067

[21] Appl. No.: 550,897

[22] Filed: Oct. 31, 1995

[51] Int. Cl.⁶ ........................ H02K 16/04
[52] U.S. Cl. ............... 310/266; 310/156; 310/264; 310/261; 310/266; 310/268
[58] Field of Search .................. 310/266, 156, 310/261, 264, 268

[56] References Cited

U.S. PATENT DOCUMENTS

| | | | |
|---|---|---|---|
| 1,591,435 | 7/1926 | Rohde | 310/266 |
| 2,722,617 | 11/1955 | Cluwen et al. | 310/103 |
| 3,247,407 | 4/1966 | Bruneel | |
| 4,318,019 | 3/1982 | Teasley et al. | 310/156 |
| 4,371,801 | 2/1983 | Richter | 310/156 |
| 4,618,792 | 10/1986 | Yates | 310/156 |
| 4,692,631 | 9/1987 | Dahl | 290/55 |
| 4,692,646 | 9/1987 | Gotou | 310/184 |
| 4,703,211 | 10/1987 | Yazaki et al. | 310/179 |
| 4,763,050 | 8/1988 | Ruppert | 318/254 |
| 4,866,321 | 9/1989 | Blanhard et al. | 310/112 |
| 5,184,040 | 2/1993 | Lim | 310/114 |
| 5,262,693 | 11/1993 | Holka | 310/121 |
| 5,272,378 | 12/1993 | Wither | 290/1 R |
| 5,311,092 | 5/1994 | Fisher | 310/266 |
| 5,341,060 | 8/1994 | Kawamura | 310/153 |
| 5,350,991 | 9/1994 | Bae | 318/727 |
| 5,495,131 | 2/1996 | Goldie et al. | 310/12 |

Primary Examiner—Thomas M. Dougherty
Assistant Examiner—K. Tamai
Attorney, Agent, or Firm—Harness Dickey & Pierce P.L.C.

[57] ABSTRACT

An apparatus for generating electrical energy includes at least one fixedly mounted stator having a generally cylindrical cross-section and further including an inner periphery and an outer periphery. The apparatus additionally includes a rotor which is mounted for rotation relative to the stator about an axis. A plurality of field windings is mounted to the stator to extend about its periphery preferably in a serpentine manner. Further, the apparatus includes first and second groups of permanent magnets. The first group of permanent magnets is mounted to the rotor and is axially arranged about the axis such that the first group of magnets faces the inner periphery of the stator. The second group of magnets is mounted to the rotor and is arranged about the axis such that the second group of permanent magnets faces the outer periphery of the stator.

1 Claim, 2 Drawing Sheets

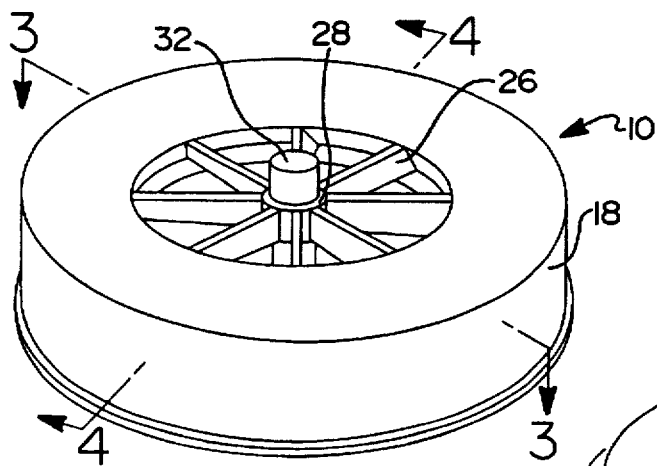
FIG 1
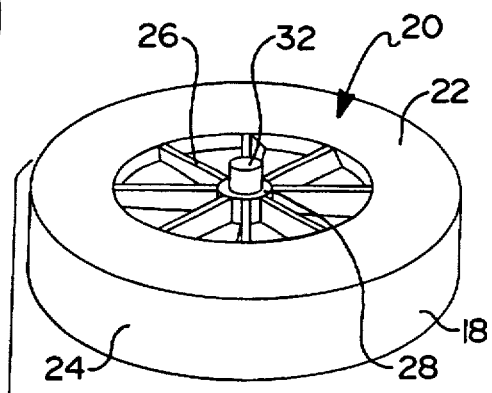
FIG 2
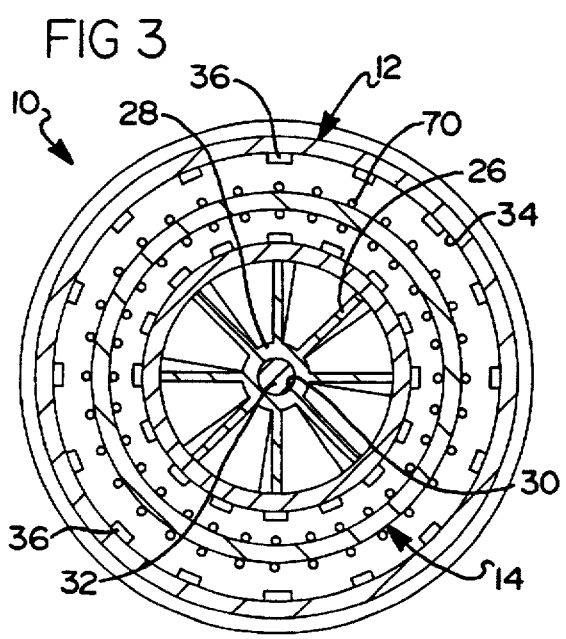
FIG 3
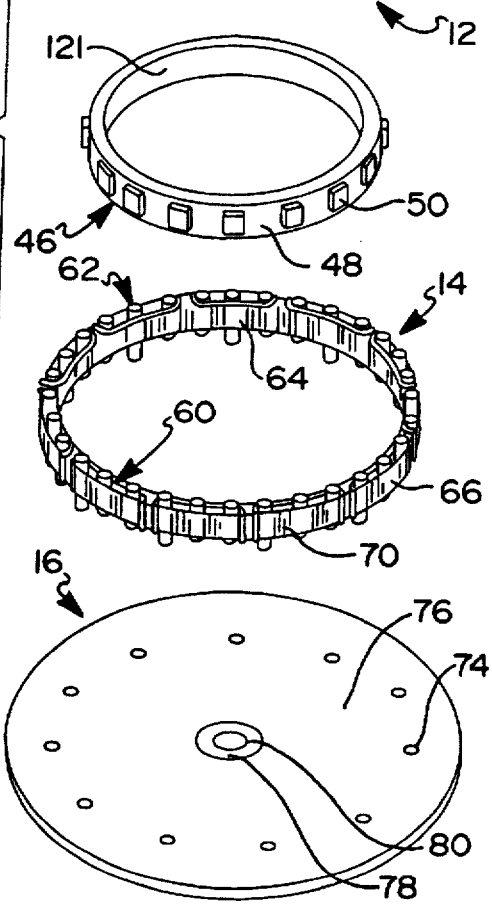

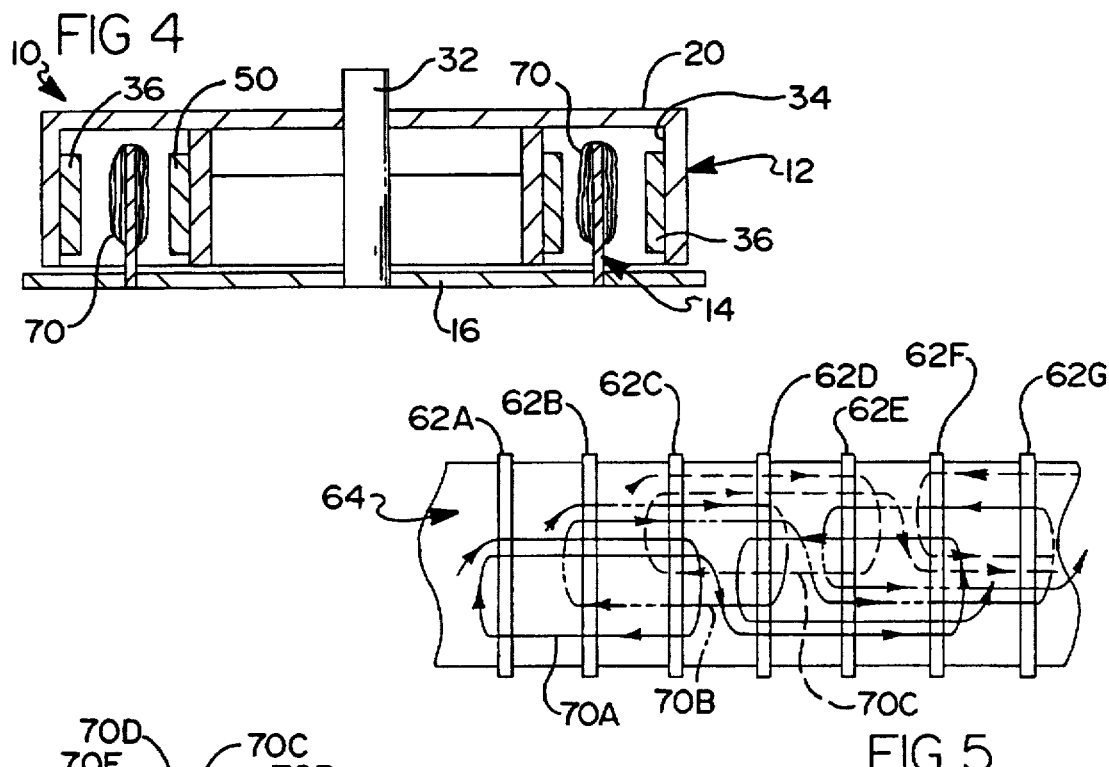
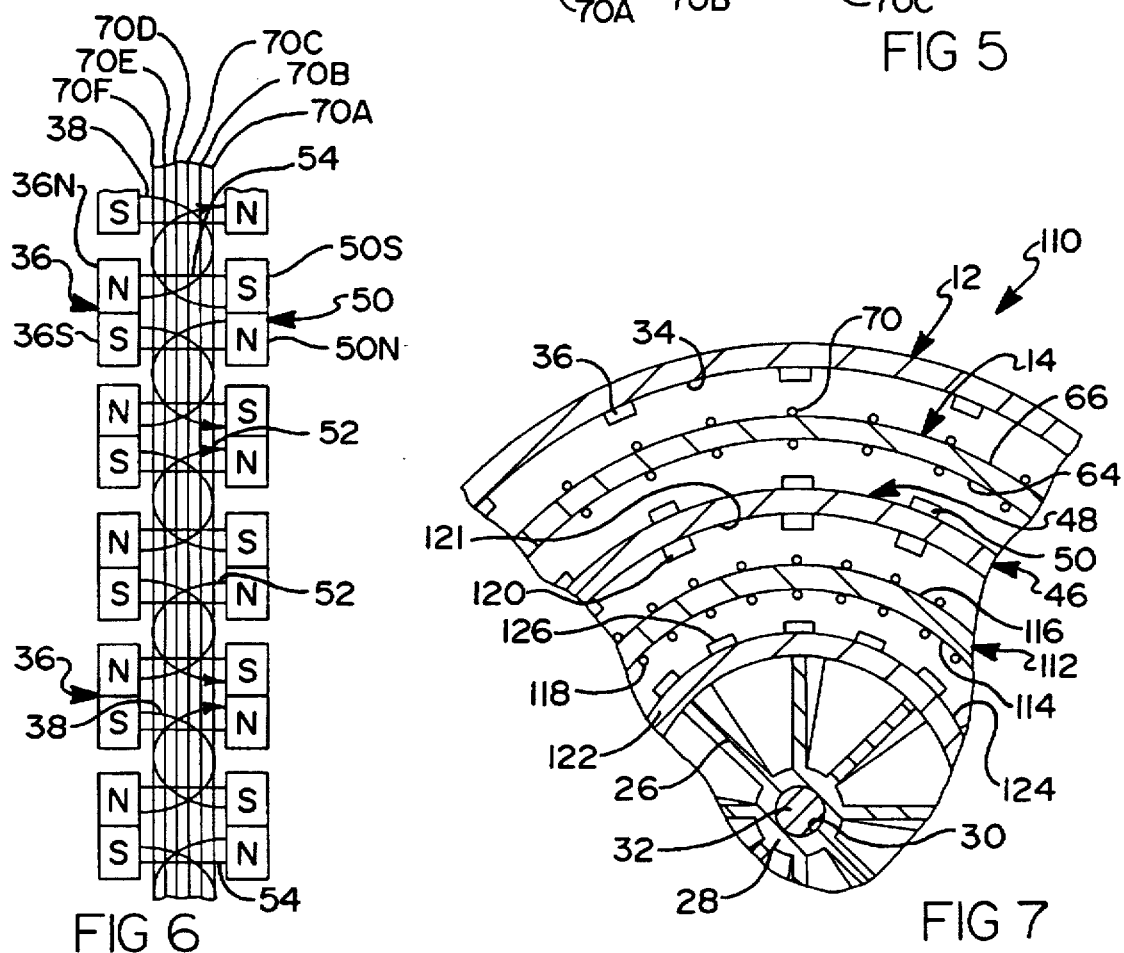

METHOD AND APPARATUS FOR GENERATING ELECTRICAL ENERGY

BACKGROUND OF THE INVENTION

1. Technical Field

The present invention relates generally to a method and apparatus for generating electrical energy from a mechanical input. More particularly, the present invention relates to a generator which utilizes the force of magnetic attraction or repulsion between permanent magnets to generate extremely high induced electrical output values and a method of using the generator.

2. Discussion

An important consideration in the preservation and improvement of the environment is the control and elimination of pollution associated with the by-products of numerous techniques utilized in the production of bulk electric power. The production of bulk electric power for industrial, residential, and rural use generally employs large-scale production of electric power in stationary plants designed specifically for those purposes. Typically, the generating units in these plants convert energy from the following sources of raw energy: water, coal, natural gas, oil and nuclear fuels to electrical energy. While known techniques for generating electricity have proven to be commercially viable, all are fraught with one or more drawbacks. Such drawbacks include, but are not limited to, the cost of equipment utilized for conversion, the cost and availability of the raw sources of fuel, and the actual and potential contamination of soil, water and the atmosphere from pollution.

It is also known that wind currents can be successfully harnessed for conversion to electrical power. In fact, the rudimentary use of wind currents dates back to sailing ships and windmills. Modernly, a significant amount of interest has developed in wind currents relating to the production of electricity with wind turbines. Wind currents represent a source of raw fuel which is abundant and clean. Furthermore, wind currents have no associated costs and will not be subject to depletion.

Modern wind turbine technology has demonstrated the potential for alleviating the demanding and escalating energy needs of the United States as well as the rest of the world. Most typically, energy from wind currents is harnessed through an arrangement of numerous rotors individually coupled to generators. In a typical application, wind currents cause the blades of the rotors to spin and each generator outputs ac current which travels through a cable into a remote field transformer. The voltage is increased and sent to a substation that converts it to an even higher voltage. The resulting power can be distributed over utility transmission lines and converted to a usable voltage at remote pole transformers before it is ultimately received by the consumer.

It is also known to utilize a moving magnetic field for the purpose of generating an electric field and therefore an electromotive force, by electromagnetic induction. In essence, the electromotive force or voltage is induced by the action of magnetic lines of force cutting an electrical conductor due to the movement of the magnetic field relative to the conductor. More particularly, where a conducting member such as a bar or wire moves through a magnetic field, each free electron within the conducting member experiences a force due to its motion through the field. If the direction of the motion is such that a component of the force on the electrons is parallel to the conducting member, the electrons will move along the conducting member. The electrons will move until the forces due to the motion of the conducting member through the magnetic field are balanced by electrostatic forces that arise because electrons collect at one end of the conducting member, thereby leaving a deficit of electrons at the other end. Thus, an electric field along the conducting member, and hence a potential difference between the ends of the conducting member exists while the motion continues.

Various electric machines presently in use are premised on the above general relationship. For example, a generator customarily utilizes one member to provide a magnetic field and another member, the stator, to form a conductor which can carry a current under the influence of the field. Generators constructed upon these principles have heretofore been proposed for use with turbines powered by wind currents.

However, such arrangements have also been associated with significant disadvantages. For example, the efficiencies of known generators have rendered such arrangements cost ineffective. In this regard, the relative orientations of the conducting members and magnetic fields in known generators are subject to improvement In view of the above, a need clearly exists to develop both a method and an apparatus for generating electrical energy having significantly improved efficiency.

SUMMARY OF THE INVENTION

It is a principal object of the present invention to provide a method and apparatus for generating electrical power from a moving magnetic field in such a way so as to realize a maximum efficiency with a relatively high electrical output value in relation to the motive power or input required.

It is a related object of the present invention to provide a generator in which the voltage induced in a conductor member results from the mutual opposition or attraction between the magnetic fields of permanent magnets, while at the same time reducing the magnetic opposition to rotation and substantially increasing the electrical outputs of the individual magnetic field producing elements.

It is an additional object of the present invention to provide an apparatus for generating power which is suitable for replacing or supplementing conventional methods for generating power during times of peak demand for electrical power.

It is a further object of the present invention to provide an apparatus for producing electrical energy which is adapted to operate in areas close to population centers, and thereby eliminate costs and power losses associated with the transfer of electrical energy over significant distances.

Another object of the present invention is to provide a generator capable of producing extremely high voltages through a novel orientation of permanent magnets and field windings by creating mutual interference with or interaction between the magnetic fields under relative motion.

It is yet another object of the present invention to provide an apparatus for generating power which utilizes raw fuel in the form of wind currents produced by vehicular traffic in areas of substantial traffic flow.

It is still yet another object of the present invention to provide an apparatus for generating power which produces an increased magnetic field, allows for the incorporation of additional conductive material, and defeats magnetic opposition to rotation.

These and other objects of the present invention are provided by an apparatus for generating electrical energy which includes a fixedly mounted stator and first and second groups of permanent magnets mounted for rotation relative to the stator. In the preferred embodiment, the first and second groups of permanent magnets are arranged concentrically to one another at different radial distances about a common axis of rotation and the fixedly mounted stator is concentrically interdisposed between the first and second groups of permanent magnets.

In one preferred embodiment, the apparatus of the present invention is directed to an apparatus for generating electricity which includes a rotor and a stator. The stator has a generally cylindrical cross-section and includes an inner periphery and an outer periphery. The rotor is mounted for rotation relative to the stator about an axis. The apparatus further includes a plurality of field windings mounted to the stator to extend about its periphery in a serpentine manner. Additionally, the apparatus includes first and second groups of permanent magnets. The first group of permanent magnets is mounted to the rotor and is axially arranged about the axis of rotation such that the first group of magnets faces the inner periphery of the stator. The second group of magnets is mounted to the rotor and is arranged about the axis such that the second group of permanent magnets faces the outer periphery of the stator.

In another preferred embodiment, the apparatus of the present invention is directed to an apparatus for generating electrical power which includes a fixedly mounted stator. The fixedly mounted stator has a generally cylindrical inner periphery and a generally cylindrical outer periphery. The apparatus further includes first and second groups of permanent magnets. The permanent magnets of the first and second group are axially arranged relative to one another about a common axis. The first and second groups are further arranged concentrically at different radial distances about the axis. The apparatus further includes a first plurality of field windings mounted to extend about the inner periphery of the stator in a serpentine manner such that the first plurality of field winding is facing the first group of permanent magnets. Similarly, a second plurality of field windings is mounted to extend about the outer periphery of the stator in a serpentine manner such that the second plurality of field windings is facing the second group of permanent magnets. The apparatus further includes means for rotating the first and second groups of permanent magnets relative to said first and second plurality of field windings.

The method of the present invention is directed to a method of generating electrical energy which includes the steps of:

providing a stator having a generally cylindrical main body portion, and a plurality of winding posts;
  winding a plurality of field windings around the winding posts;
  arranging a first group of permanent magnets in a circular pattern adjacent to an inner peripheral surface of the stator;
  arranging a second group of permanent magnets in a circular pattern adjacent to an outer peripheral surface of the stator; and
  rotating the first and second groups of permanent magnets about a common axis of rotation.

The above and various other advantages and features of novelty which characterize the present invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described preferred embodiments of the present invention.

BRIEF DESCRIPTION OF THE DRAWINGS

In the drawings in which reference numerals include corresponding components throughout the several views:

FIG. 1 is a perspective view of a generator constructed in accordance with a first preferred embodiment of the present invention;

FIG. 2 is a partially exploded view of the generator of FIG. 1;

FIG. 3 is a cross-sectional view along the line 3—3 of FIG. 1;

FIG. 4 is a cross-sectional view along the line 4—4 of FIG. 1;

FIG. 5 is an enlarged diagrammatically representation illustrating the three-phase winding pattern of the field windings attached to the outer peripheral surface of the stator of FIGS. 2-4;

FIG. 6 is a diagrammatically representation of the lines of magnetic force established between the first and second groups of permanent magnets and the orientation of the lines of magnetic force relative to the three phase windings of the stator; and FIG. 7 is a partial view similar to FIG. 3 illustrating the orientation of the field windings and permanent magnets in a generator constructed in accordance with the teachings of a second preferred embodiment of the present invention.

The following detailed description utilizes various terminology intended to indicate general direction for purposes of describing the figures to which reference is being made. For example, it will be understood that the terminology "clockwise" and "counterclockwise" will be used as a convenience to designated relative directions in the drawings.

DETAILED DESCRIPTION OF THE PREFERRED EMBODIMENTS

The present invention is directed to an apparatus for generating electrical energy. More specifically, the present invention is directed to an improved generator which is highly effective for harnessing a low source of raw energy for conversion to electrical energy. One anticipated exemplary use of the generator of the present invention is in cooperation with a wind turbine for generating electrical energy from captured wind currents. A thorough description of a suitable wind turbine arrangement for use with the generator of the present invention is set forth in commonly owned U.S. Pat. No. 5,272,378 which issued on Dec. 21, 1993. U.S. Pat. No. 5,272,378 is hereby incorporated by reference as if fully set forth herein.

Briefly, U.S. Pat. No. 5,272,378 illustrates and describes a system incorporating one or more wind turbines and cooperating structure for capturing wind currents produced by vehicular traffic in areas of substantial traffic flow. The wind turbines are mounted for rotation about a vertical axis and are open to accept wind currents at two diametrically opposed sides. Thus, vehicle traffic passing adjacent to either opposed side serves to rotate the rotor about its axis. The resulting electrical power can be utilized for lighting of the roadway, charging electric vehicles in roadside service/ charging areas or similar applications. Futher, the resulting electrical power can be transferred to remote locations as a supplement to or a substitute for conventionally generated electricity. In this regard, peak demands for electrical energy often correspond with times of high traffic, thereby enhancing the possibility of alleviating energy demands which may otherwise result in partial or total black-outs.

As will become apparent to those skilled in the art, the generator of the present invention which will be described herein is highly efficient and thereby particularly well-suited for converting a low source of energy, such as energy from wind currents, into electrical energy. However, the teachings of the present invention are not limited to such an exemplary use. In this regard, the high efficiency generator of the present invention is also compatible with advancing technology relating to high rpm super flywheels when made part of or attached to such a super flywheel. Super flywheels are modernly used to store relatively large quantities of energy for use at a later time away from their spin driving energy source. In such an arrangement, the free flowing generator would spin rapidly on near-frictionless bearings and housed within a vacuum chamber. A mechanical input source of energy would be used to spin the generator, thereby allowing energy to be drawn for use at a later time. For example, the source of energy used to spin the generator could be in the form of conventionally produced electricity during periods of low demand used to rotate a drive shaft.

Referring now to FIGS. 1 through 6, in which like elements have been identified with identical reference numerals, an apparatus for generating electrical power constructed in accordance with the teachings of a first preferred embodiment of the present invention is generally identified with reference numeral 10. As most clearly shown in the partially exploded view of FIG. 2, the apparatus for generating electrical power, or the generator 10, includes a rotor 12, a stator 14 and a base member 16. As will become more apparent below, the rotor 12 is mounted for rotation about a generally vertical axis relative to the stator 14 and the base member 16.

With reference to FIGS. 2 and 3, the rotor 12 is illustrated to include a generally cylindrical sidewall 18 and a top 20. The top 20 includes a radial flange 22 abutting an upper edge 24 of the generally cylindrical sidewall and a plurality of spokes 26 which are equally spaced axially about a central hub 28. Each spoke 26 of the plurality of spokes interconnects the central hub 28 and the radially extending flange 22 of the top 20. The hub 28 includes a centrally located aperture 30 for receiving a vertically oriented drive shaft 32. The drive shaft 32 is fixedly attached to the rotor 12 and defines a vertical axis about which the rotor 12 rotates.

In one application, the generally cylindrical sidewall 18 of the rotor 12 is fashioned from an conductive material such as aluminum. However, it will be appreciated that non-conductive materials, including but not limited to thermoplastic materials, may be alternatively used to form cylindrical sidewall 18.

The cylindrical sidewall 18 includes an inner periphery 34 to which a first group of permanent magnets 36 are attached. The permanent magnets 36 of the first group are equally spaced thereabout and are uniformly shaped. In the exemplary embodiment illustrated, the permanent magnets 36 are comparable in proportions and dimension to a domino. However, it will be readily appreciated that other shapes and sizes of permanent magnets 36 may be used. In a conventional manner, each permanent magnet 36 includes a north pole 36N and south pole 36S. The magnetization of the individual permanent magnets 36 is oriented generally perpendicular to the large faces of the magnets 36. Further, each permanent magnet 36 is attached to the inner periphery 34 of the generally cylindrical sidewall 18 so that its opposite poles 36N and 36S are horizontally arranged. That is, a right face of the permanent magnet 36 is the north pole 36N and the left face of the permanent magnet 36 is a south pole 36S, or vice versa.

The magnetic senses or polarization of adjacent permanent magnets 36 are arranged so as to be opposing. That is, if the north pole 36N of a given permanent magnet 36 is positioned on the left side of the permanent magnet 36, the north pole 36N of adjacent permanent magnets 36 to either side thereof are positioned so as to be on the right side. As a result, a field reversal is encountered between each adjacent permanent magnet 36 as one progresses from one permanent magnet 36 to the next permanent magnet 36 about the inner periphery 34 of the generally cylindrical sidewall 18. The nature of the external magnetic field resulting from this arrangement of the permanent magnets 36 is shown in FIG. 6 by the resulting magnetic lines of flux identified with reference numeral 38.

In the exemplary embodiment illustrated, the first group of permanent magnets 36 is shown to include sixteen magnets 36. However, those skilled in the art will readily appreciate that the particular number of permanent magnets 36 is largely a matter of design choice. That is, the number of permanent magnets 36 of the first group will be understood to be subject to change without departing from the fair scope of the present invention. Further in this regard, it will be understood that the particular quantities for various elements identified throughout the remainder of this detailed description are similarly subject to modification depending on particular application requirements.

The rotor 12 of the generator 10 of the present application is further shown to include an inner cylindrical member 46 having an outer periphery 48. In the exemplary embodiment illustrated throughout the drawings, the inner cylindrical member 46 will be understood to be welded or otherwise suitably fastened to the inner surface (not shown) of the top 20 of the rotor 12. Alternatively, the inner cylindrical member 46 may be unitarily formed with the remaining structure of the rotor 12. It will be understood that the rotor 12 can be constructed of a conductive or non-conductive material.

A second group of permanent magnets 50 is permanently affixed to the outer periphery 48 of the cylindrical member 46. In the embodiment illustrated, the second group of permanent magnets 50 includes sixteen permanent magnets, thereby corresponding in number to the permanent magnets 36 of the first group. Similar to the first group, the permanent magnets 50 of the second group are equally spaced axially about the axis of rotation of the rotor 12 and are oriented so as to include north poles 50N and south poles 50S which alternate thereabout. Thus, adjacent permanent magnets 50 of the second group similarly create magnetic fields. Again, the nature of the external magnetic fields resulting from this arrangement of the permanent magnets 50 are represented in FIG. 6 by the magnetic lines of flux 52.

The permanent magnets 50 of the second group of permanent magnets are further oriented such that each north pole 50N is radially aligned with one of the south poles 36S of the permanent magnets 36 of the first group of permanent magnets and each south pole 50S is radially aligned with one of the north poles 36N of the permanent magnets 50 of the second group of permanent magnets. That is, where a permanent magnet 50 of the second group of permanent magnets is oriented such that the north pole 50N is on the left side and the south pole 50S is on the right side, the radially adjacent magnet 36 of the first group of permanent magnets is oppositely oriented such that the south pole 36S is on the left side and the north pole 36N is on the right side. As a result, a third set of magnetic fields are established between each of the radially adjacent permanent magnets 36 and 50 from the first and second group of permanent magnets. The nature of the external magnetic fields resulting from this novel arrangement of the first and second groups of magnets 36 and 50 is again represented in FIG. 6 and identified by the magnetic lines of flux 54. Thus, the first and second groups of permanent magnets 36 and 50 cooperate to define three distinct sets of magnetic fields, or three distinct sets of magnetic lines of flux 38, 52 and 54.

Although while not preferred, it will be appreciated by those skilled in the art that one or both of the first and second groups of permanent magnets 36 and 50 can be eliminated in favor of a continuously formed magnetic ring. Furthermore, one, but not both, of the first and second groups of permanent magnets 36 and 50 could be eliminated in favor of a ferrous material. In such alternative arrangements, the magnetic fields between the remaining group of permanent magnets and the ferrous material would be retained.

With continued reference to FIGS. 2 and 3, the stator 14 of the generator 10 of the present invention is illustrated to include a hoop-shaped coil ring, or main body 60 having a plurality of axially extending winding posts 62. In one application, the main body portion 60 is approximately 18 inches in diameter and is constructed of a non-magnetic material and is non-conductive. Alternatively, a conductive material may be used. The main body portion 60 includes an arcuate inner peripheral surface 64 and an arcuate outer peripheral surface 66. In the exemplary embodiment illustrated throughout the drawings, the stator 14 includes winding posts 62 which uniformly extend upward from a top edge of the main body portion 60 approximately one-fourth inch. Similarly, two of every three winding posts 62 downwardly extend approximately one-fourth inch. For purposes of fixedly attaching the stator 14 to the base member 16 which will become more apparent below, every third winding post 62 downwardly extends approximately one-half inch.

As illustrated in FIGS. 2–5, a plurality field windings 70 or coils are wound in a serpentine fashion about the inner peripheral surface 64 and the outer peripheral surface 66 of the main body portion 60 of the stator 14. As specifically shown in the diagrammatical illustration of FIG. 5, a first of the field windings 70A is wrapped clockwise about a first group of three consecutive winding posts 62 including the winding posts identified as 62A, 62B and 62C. Next, the first field winding 70A is continued and wrapped counterclockwise around an adjacent second group of three consecutive winding posts 62 which includes winding posts identified as 62D, 62E and 62F. This pattern is repeated about the inner peripheral surface 64 of the main body portion 60 of the stator 14.

This first field winding 70A serves as one of three phase windings carried by the stator 14. In this regard the plurality of field windings 70 further includes second and third field windings 70B and 70C, respectively, wrapped about the winding posts 62 in a similar fashion. The positioning of the second and third field windings 70B and 70C is shown most clearly in FIG. 5 with each of the three phase windings comprising three parallel conductors. Specifically, the second field winding 70B is similarly wound about clockwise about a third group of three winding posts 62 and counterclockwise about fourth groups of three winding posts 62. The third and fourth groups of winding posts are displaced one winding post 62 to the right from those occupied by the first field winding 70A. That is, the third group of winding posts 62 includes winding posts 62B, 62C and 62D. The fourth group includes winding posts 62E, 62F and 62G.

The third field winding 70C is wound about a fifth group of three winding posts 62 in a clockwise direction and then about an adjacent sixth group of three winding posts 62 in a counterclockwise direction. The winding posts 62 of the fifth group include winding posts 62C, 62D and 62E, and the winding posts 62 of the sixth group include 62F, 62G, and the next subsequent winding post not illustrated in FIG. 5. As a result, if one is to progress from the gap between adjacent winding posts 62 to the next gap between adjacent winding posts 62 one would encounter field winding 70A, then field winding 70B, then field winding 70C, etc., as shown in FIG. 5. The pattern discussed is continued until the desired amount of coil is carried by the inner peripheral surface 64 of the cylindrical body 60.

The stator 14 similarly includes fourth, fifth and sixth field windings 70D, 70E, and 70F wrapped about the winding posts 62 and positioned about the outer peripheral surface 66 of the main body portion 60. The field windings 70D, 70E, and 70F on the outer peripheral surface 66 are arranged in a manner substantially identical to that described above with respect to the inner peripheral surface 64. Thus, a second set of three phase windings are provided.

With continued reference to FIG. 6, illustrated are the field windings 70A, 70B and 70C of the inner peripheral surface 66 and the field windings 70D, 70E, and 70F of the outer peripheral surface 64. It will be recognized from FIG. 6 that as the first and second groups of magnets 36 and 50 are rotated relative to the fixed position of the field windings 70A through 70F, an alternating current voltage will be induced in each of the field windings 70A through 70F. It will be further recognized that because of the angular displacement of the field windings 70A through 70F relative to the magnetic lines of flux 38, 52 and 54, the induced voltages of the three field windings 70A through 70C and the three field windings 70D through 70F will both be 120° out of phase.

Because three phase voltages are generated, the output may be rectified and inexpensively filtered to produce a dc source where desired. The field windings 70A through 70C of the inner peripheral surface 66 and the field windings 70D through 70F of the outer peripheral surface 64 may be connected in series or in parallel as desired to achieve twice the individual voltage or current capacities, respectively. It will be understood that the frequency of the induced voltages is obviously proportionally to the speed of rotation of the rotor 12 about its axis of rotation.

With specific reference to FIG. 2, the base member 16 is shown to include a plurality of apertures 74 for receiving every third winding post 62 of the stator 14. The remainder of the winding posts 62 are adapted to rest on an upper surface 76 of the base member 16. Base member 16 includes a central aperture 78 which captures a thrust bearing 80. The thrust bearing 80 is adapted to rotatably support the drive shaft 32.

Turning now to FIG. 7, a generator 110 constructed in accordance with the teachings of a second preferred embodiment of the present invention will now be described. The generator 110 of the second preferred embodiment is substantial identical to the generator 10 of the first preferred embodiment with the exception that the second preferred embodiment 110 incorporates an additional stator and two additional cooperating groups of permanent magnets. This being true, identical or substantially identical elements between the generators of the first and second embodiments 10 and 110 will be referenced with numerals introduced with respect to the generator 10 of the first embodiment.

As noted, the generator 110 second preferred embodiment includes a second fixedly mounted stator 112. Similar to the stator 14, the second stator 112 is substantially cylindrical in cross-section and includes an inner peripheral surface 114 and an outer peripheral surface 116. A plurality of field windings, which are generally identified in FIG. 9 with reference numeral 118, are attached to both the inner peripheral surface 114 and the outer peripheral surface 116 in a serpentine manner substantially identical to that described above with respect to the stator 14.

The generator 110 of the second preferred embodiment further includes a third group of magnets 120 axially arranged about the center of rotation of the rotor 12. In the exemplary embodiment illustrated, the third group of permanent magnets 36 is attached to an inner periphery 121 of the inner cylindical member 46 and includes sixteen magnets 120. The magnetization of the individual permanent magnets 120 of the third group is oriented generally perpendicular to the large faces of the magnets 120. Further, each permanent magnet 120 is attached to the inner periphery 121 of the inner cyclindrical member 46 so that its opposite poles (not shown) are horizontally arranged. That is, a right face of the permanent magnet 120 is the north pole and the left face of the permanent magnet 120 is a south pole, or vice versa.

The magnetic senses or polarization of adjacent permanent magnets 120 are arranged so as to be opposing. That is, if the north pole of a given permanent magnet 120 is positioned on the left side of the permanent magnet 120, the north pole of adjacent permanent magnets 120 to either side thereof are positioned so as to be on the right side. As a result, a field reversal is encountered between each adjacent permanent magnet 120 as one progresses from one permanent magnet 120 to the next permanent magnet 120 about the inner periphery 121 of the cylindrical member 46.

The generator 110 constructed in accordance with the second preferred embodiment of the present invention is further shown to include a second inner cylindrical member 122 having an outer periphery 124. In the exemplary embodiment illustrated throughout the drawings, the second inner cylindrical member 122 is substantially identical to inner cylindrical member 46 and will be similarly understood to be welded or otherwise suitably fastened to the inner surface (not shown) of the top 20 of the rotor 12.

A fourth group of permanent magnets 126 is mounted to the outer periphery 124 of the second cylindrical member 122. In the embodiment illustrated, the fourth group of permanent magnets 126 includes sixteen permanent magnets, thereby corresponding in number to the permanent magnets 120 of the third group. Similar to the third group, the permanent magnets 126 of the fourth group are equally spaced axially about the axis of rotation of the rotor 12 and are oriented so as to include north poles and south poles which alternate thereabout. Thus, adjacent permanent magnets 126 of the fourth group similarly create magnetic fields.

The permanent magnets 126 of the fourth group of permanent magnets are further oriented such that each north pole is radially aligned with one of the south poles of the permanent magnets 120 of the third group of permanent magnets and each south pole is radially aligned with one of the north poles of the permanent magnets 126 of the fourth group of permanent magnets. That is, where a permanent magnet 126 of the fourth group of permanent magnets is oriented such that the north pole is on the left side and the south pole is on the right side, the radially adjacent magnet 120 of the third group of permanent magnets is oppositely oriented such that the south pole is on the left side and the north pole is on the right side. As a result, an additional set of magnetic fields are established between each of the radially adjacent permanent magnets 120 and 126 from the third and fourth groups of permanent magnets. Thus, the third and fourth groups of permanent magnets 120 and 126 cooperate to define three distinct sets of magnetic fields. These three distinct sets of magnetic fields are similar to the three fields defined by the first second groups of permanent magnets 36 and 50 of the generator 10 of the first preferred embodiment which are identified in FIG. 6 as 38, 52 and 54.

Thus, the generator 110 of the second preferred embodiment of the present invention is illustrated to included first stator 14 for cooperating with first and second groups of permanent magnets 36 and 50, and second stator 112 for cooperating with third and fourth groups of permanent magnets 120 and 126. At this point, it should now be apparent to those skilled in the art that the pattern established by the generator 110 may be repeated to any desired degree. That is, the next logical succession of the generator would include a third stator and fifth and sixth groups of permanent magnets.

The method of the using the generator 10 of the present invention heretofore detailed will now be described. The first step of the method involves providing stator 12 which includes cylindrical main body portion 60. Stator 12 additionally includes inner peripheral surface 66, outer peripheral surface 64 and the plurality of winding posts 62. The next step of method of the present invention involves winding a plurality of field windings 70A through 70F around the winding posts 62. Next, the first group of permanent magnets 36 are arranged in a circular pattern concentrically disposed to the stator 14, the first group of magnets 36 are concentrically being disposed within the stator 14. Similarly, the second group of permanent magnets 50 is arranged in a circular pattern concentrically disposed to the stator 14. The circular pattern of the second group of permanent magnets 50 lies beyond the boundaries of the stator 14. Finally, the method of the present invention includes the step of rotating the first and second groups of permanent magnets 36 and 50 about a common axis of rotation.

The foregoing discussion discloses and describes presently preferred embodiments of the present invention. One skilled in the art will readily recognize from such discussion, and from the accompanying drawings and claims, that various changes, modifications and variations can be made therein without departing from the spirit and scope of the invention as defined in the following claims. With certain applications where the source of energy may be subject to intermittent lapses, it may be desirable to incorporate an external flywheel coupled to further maintaining energy output. Further, it may be desirable to incorporate a motor for initially powering up the generator.

I claim:

1. An apparatus for generating electricity, said apparatus comprising:

a first fixedly mounted stator, said first fixedly mounted stator constructed of a non-magnetic material and having a generally cylindrical cross section with an inner periphery and an outer periphery, said stator constructed of a non-conductive material;

a second fixedly mounted stator having a generally cylindrical cross section with an inner periphery and an outer periphery, said second stator disposed concentrically with said first stator;

a rotor mounted in the apparatus for rotation about an axis;

first and second groups of permanent magnets attached to said rotor, the permanent magnets of said first and second groups each being radially axially arranged about said axis, said first and second groups of permanent magnets further being arranged concentrically at different radial distances about said axis, said first and second groups of permanent magnets being arranged to produce a plurality of first magnetic fields in at at least one plane perpendicular to said axis;

a third group of permanent magnets attached to said rotor and disposed adjacent said second fixedly mounted stator;

a fourth group of permanent magnets attached to said rotor and disposed adjacent said second fixedly mounted stator, said third and fourth groups of permanent magnets arranged to produce a plurality of second magnetic fields in a plane perpendicular to said axis;

a first plurality of field windings mounted to extend about said inner periphery of said first stator in a serpentine manner such that said first plurality of field windings is facing said first group of permanent magnets;

a second plurality of field windings mounted to extend about an outer periphery of said first stator In a serpentine manner such that said second plurality of field windings is facing said second group of permanent magnets;

a third plurality of field windings mounted to extend about said inner periphery of said second stator in a serpentine manner such that said third plurality of field windings is facing said third group of permanent magnets;

a fourth plurality of windings mounted to extend about said outer periphery of said second stator in a serpentine manner such that said fourth plurality of field windings is facing said fourth group of permanent magnets;

means for rotating said first, second, third and fourth groups of permanent magnets simultaneously relative to said first, second, third and fourth pluralities of field windings;

wherein said first and second pluralities of field windings pass through said plurality of first magnetic fields as said first and second groups of permanent magnets are rotated relative to said first stator;

wherein said third and fourth pluralities of field windings pass through said plurality of second magnetic fields as said third and fourth groups of permanent magnets are rotated relative to said second stator;

wherein said first plurality of field windings is attached to said inner periphery of said first stator in a repetitive pattern including alternating clockwise and counter-clockwise windings;

wherein said second plurality of field windings is attached to said outer periphery of said first stator in a repetitive pattern including alternating clockwise and counter-clockwise windings;

wherein said third plurality of field windings is attached to said inner periphery of said second stator in a repetitive pattern including alternating clockwise and counter-clockwise windings; and wherein said fourth plurality of field windings is attached to said outer periphery of said second stator in a repetitive pattern including alternating clockwise and counter-clockwise windings.

* * * * *